United States Patent [19]

Teramachi

[11] 4,296,974
[45] Oct. 27, 1981

[54] LINEAR BALL BEARING UNIT

[76] Inventor: Hiroshi Teramachi, 2-34-8 Higashi-Tamagawa, Setagaya-ku, Tokyo, Japan, 158

[21] Appl. No.: 120,670

[22] Filed: Feb. 11, 1980

[30] Foreign Application Priority Data

Feb. 14, 1979 [JP] Japan .................... 54-15911

[51] Int. Cl.³ .............................................. F16C 29/06
[52] U.S. Cl. ........................................ 308/6 C; 308/6 R
[58] Field of Search ............... 308/6 C, 6 R, 3.8, 3 A, 308/3 R, 3.5

[56] References Cited

U.S. PATENT DOCUMENTS

| 3,758,176 | 9/1973 | Stapley | 308/6 C |
| 4,040,679 | 8/1977 | Teramachi | 308/6 C |
| 4,118,101 | 10/1978 | Teramachi | 308/6 C |

Primary Examiner—Lenard A. Footland
Attorney, Agent, or Firm—George B. Oujevolk

[57] ABSTRACT

A linear ball bearing for a trapezoidal rail has ball bearings recirculating along longitudinal ball grooves. End lids are provided with turn grooves of U-shaped to interconnect the ball grooves. The end lids have guide strips with semi-cylindrical ball guide portions.

2 Claims, 13 Drawing Figures

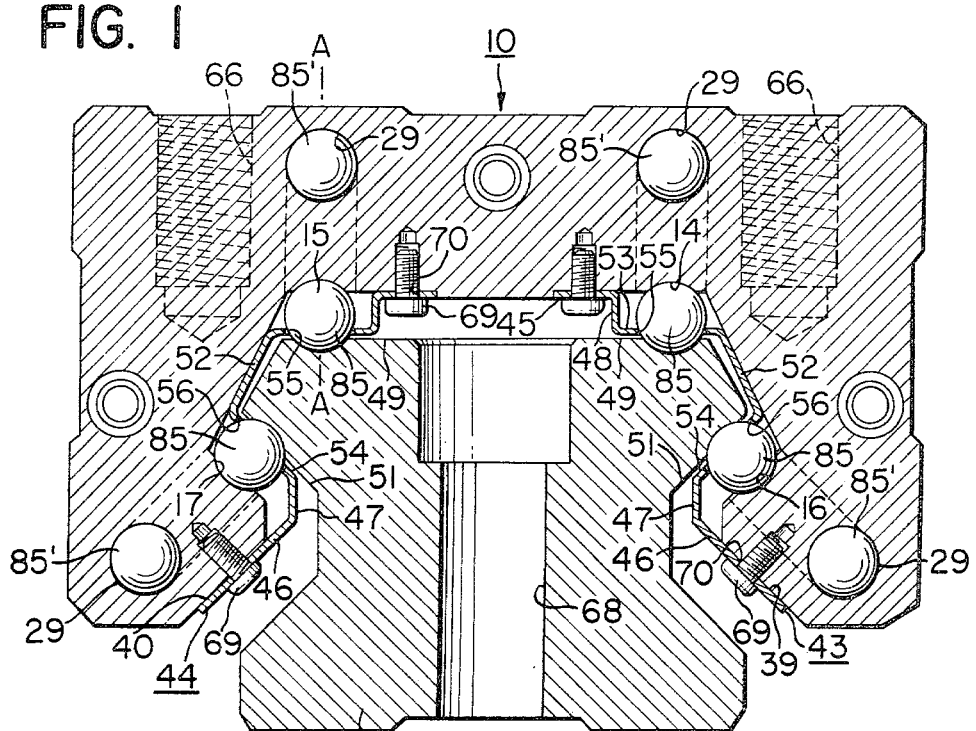
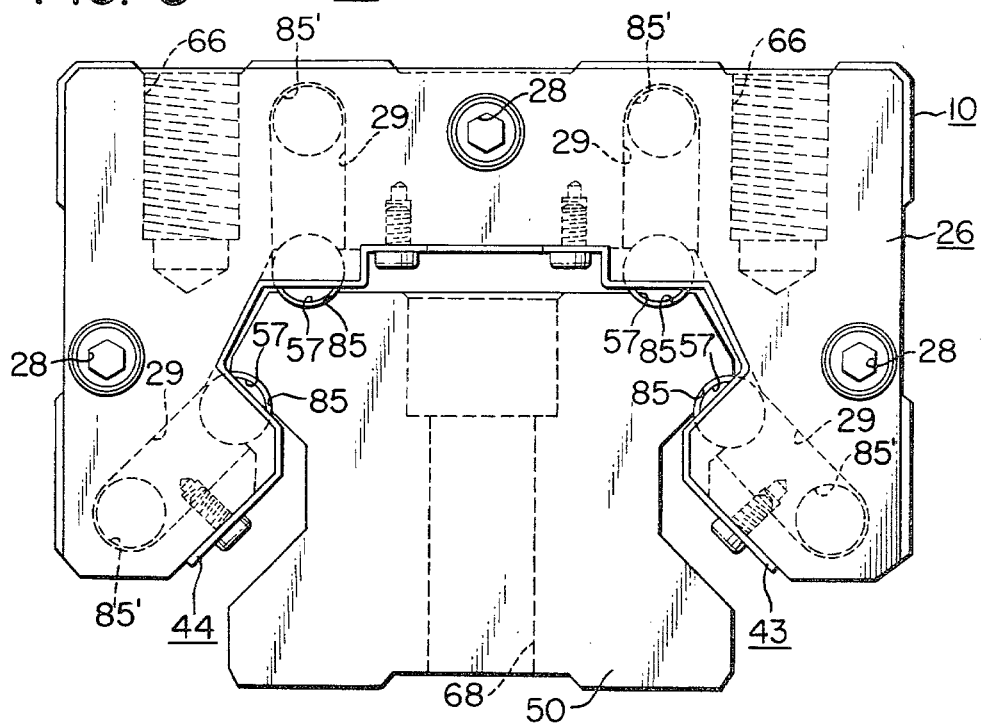

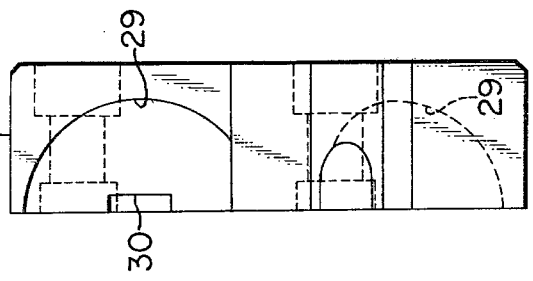
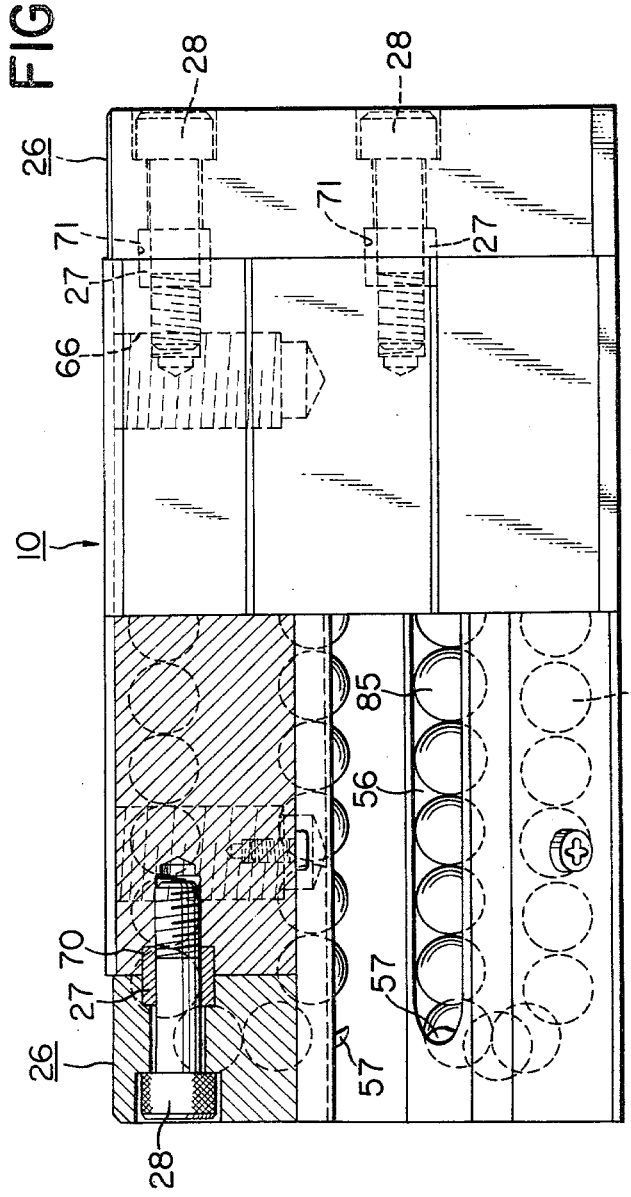
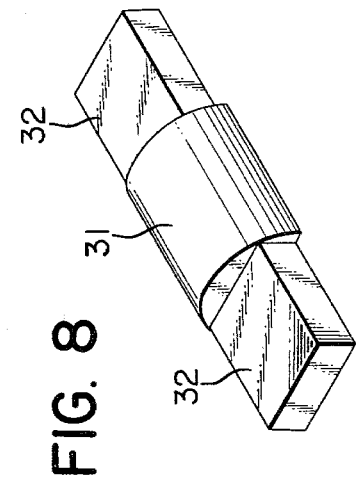
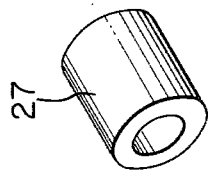

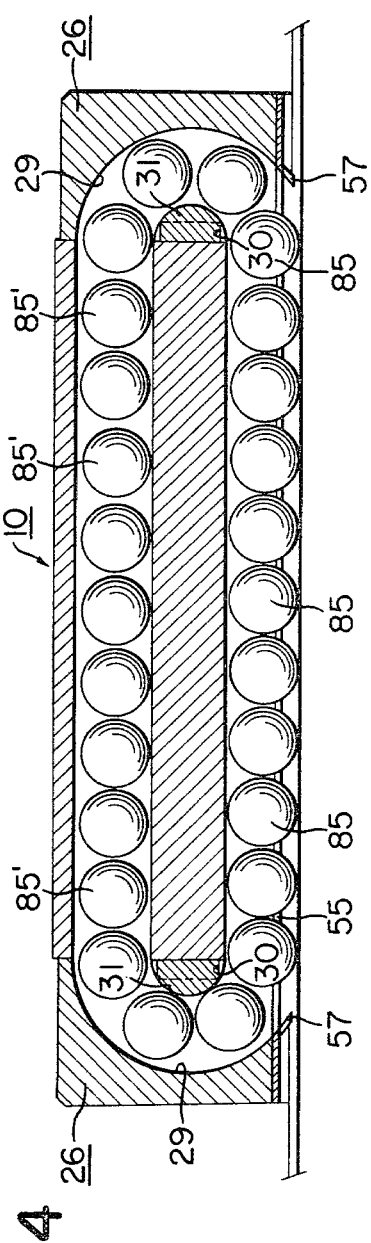

LINEAR BALL BEARING UNIT

BACKGROUND OF THE INVENTION (1) Field of the Invention

This invention relates to a linear ball bearing unit for guiding a linear movement of a machine by rolling friction with a reduced resistance to movement. More particularly, the invention concerns a linear ball bearing unit useful on slide surfaces of table saddles or machining centers of machine tools or in reciprocating sections of transfer devices which carry a weight.

(2) Description of Prior Art

The linear bearings currently in general use are of ball-push type which is capable of supporting vertical loads but can carry only a fraction of moment or upward loads.

On the other hand, a track shaft with a four-directional load-carrying bearing, disclosed in Japanese Patent Publication No. 52-43973, can take only 0.43 of upward load and 0.5 of lateral loads as compared with a rating 1 for the vertical load on the top surface.

However, the upward loads occur in extremely large magnitudes in industrial applications, and, since this problem cannot be solved by the four-directional load-carrying bearings, there often arises a necessity for an unduly large-sized bearing or a bearing of a shape which is difficult to adopt from the standpoint of designing.

Moreover, for adjusting clearance in the conventional bearings of this class, an outer cylinder is inserted into the bearing case which is provided with a slotted groove. The insertion of the outer cylinder fails to make accurate adjustment of clearance due to the existence of a fine clearance between the outer cylinder and the bearing case, and to account for the variation in height which is caused upon imposing a load.

SUMMARY OF THE INVENTION

According to the present invention, there is provided a linear ball bearing unit, comprising: a bearing body having a cavity of substantially trapezoidal shape in section and provided with longitudinal ball grooves with a radius of curvature same as the radius of balls along four corners of the cavity and longitudinal ball recirculating holes extending parallel with the respective ball grooves in radially spaced positions; end lids to be attached to the opposite ends of the bearing body through aligning bushes and provided with turn grooves of U-shape in section to interconnect the opposing ball grooves and ball recirculating holes of the bearing body, the end lids having square recesses at opposite sides of the U-shaped turn grooves to receive a guide strip across each U-shaped groove, the guide strip having a semi-cylindrical ball guide portion over the entire width of the U-shaped groove; retainers to be fitted on the inner wall surfaces of the cavity of the bearing body and provided with longitudinal slits in horizontal portions opposing the ball grooves, the slits having a width slightly smaller than the diameter of balls and being provided with round tongues integrally at opposite ends thereof; a number of balls placed in the bearings constituted by the bearing body and end lids through the retainers; and an elongated track shaft located in the cavity of the bearing body and having longitudinally therealong ball grooves of a radius of curvature same as the radius of load-carrying balls.

According to one aspect of the present invention, at least one side wall of the bearing body is formed to have an increased wall thickness and provided with a longitudinal slotted groove with an inclination relative to a horizontal plane and a number of tapped through holes formed at an angle of about 90° with the slotted groove to receive clearance adjusting bolts.

It is an object of the present invention to solve the problems arising from the conventional construction of the linear ball bearing or more particularly to provide a linear ball bearing unit with improved load-carrying capacity which has ball running surfaces or grooves in symmetrical positions on the bearing body to have a large contacting angle for upward loads, taking 0.7 of upward load as compared with a rating 1 for vertical load on the top surface.

It is another object of the present invention to provide a linear bearing unit employing slitted retainers for guiding the rolling and sliding movements of the balls, each retainer being provided with a round tongue at each end of the slit to urge smoothly the balls from a straight to a curved passage or vice versa. The retainers are obtainable simply by pressing and punching a steel sheet and thus suitable for mass production at low costs.

It is still another object of the present invention to provide a linear bearing unit which has a clearance adjusting means at one or both sides of the bearing body, allowing fine adjustment of clearance to have zero or negative angular rush with respect to upward, lateral or moment or torque loads, enhancing the service life and rigidity of the bearing.

The bearing body itself is made interchangeable since the machining errors which occur in the manufacturing process of the bearing are compensated for by the clearance adjusting means.

It is a further object of the present invention to provide a bearing body having the slitted groove formed at an angle of about 60° with a horizontal plane, making the adjustment possible even in an event of abrasive wear of the track shaft by deepening the slotted groove. In addition, the rigidity against upward loads is increased by the adjusting bolts which are adapted to press down the slotted side wall portions of the bearing body.

BRIEF DESCRIPTION OF THE DRAWINGS

The above and other objects, features and advantages of the invention will be apparent from the following description and appended claims, taken in conjunction with the accompanying drawings which show by way of example preferred embodiments of the invention and in which:

FIG. 1 is a transverse section of a linear ball bearing unit according to the present invention;

FIG. 2 is a partly cutaway side view of the linear ball bearing unit of FIG. 1;

FIG. 3 is an end view of the linear ball bearing unit;

FIG. 4 is a sectional view taken on line A—A of FIG. 1;

FIG. 5 is a front view of an end lid;

FIG. 6 is a partly sectioned side view of the end lid of FIG. 5;

FIG. 7 is a perspective view of a positioning bush to be mounted on the end lid;

FIG. 8 is an enlarged perspective view of a ball circulating guide member;

DESCRIPTION OF PREFERRED EMBODIMENTS

Figure 9:
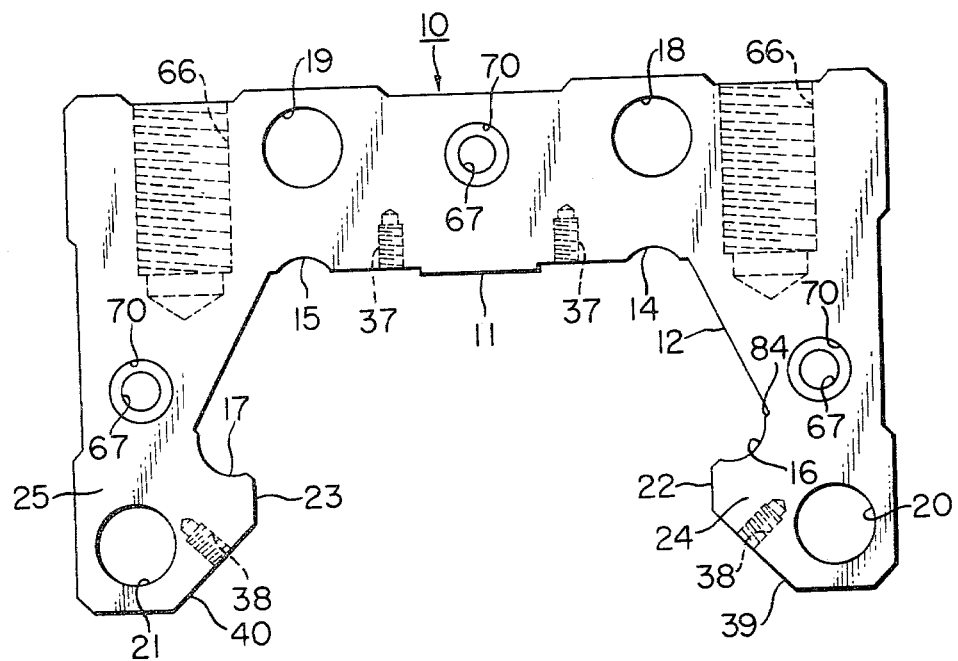
FIG. 9 is an end view of a bearing body.
Figure 10:
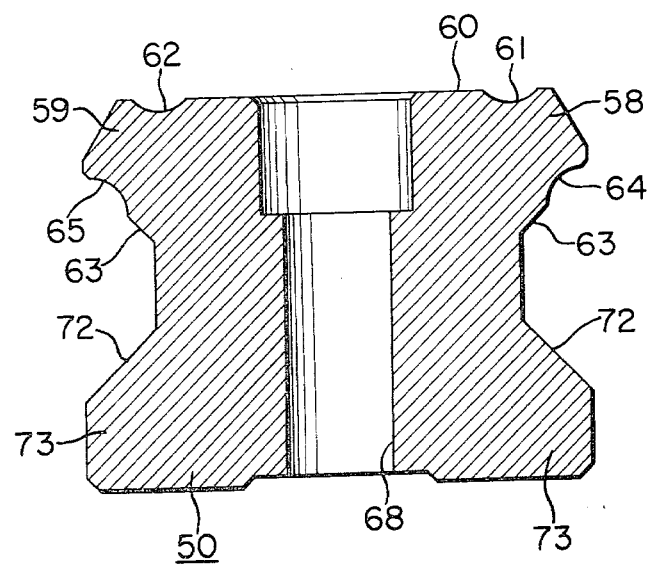
FIG. 10 is a sectional view of a track shaft.

Referring to the accompanying drawings, designated at 10 is a bearing body of steel material formed generally in a rectangular shape and having axially a trapezoidal cavity forming along opposite sides of the bearing body a pair of hook-shaped bearing portions 24 and 25, the cavity defining load-carrying areas symmetrically on the inner wall surfaces of the bearing body including the hooked portions 24 and 25.

The load-carrying areas are provided symmetrically on opposite sides of a vertical plane containing the axis of the bearing body 10, on a ceiling wall surface 11 of the cavity and divergingly inclined wall surfaces 12 and 13. A pair of axial ball circulating grooves 14 and 15 of the same radius of curvature are formed in the ceiling wall surface 11. Another pair of axial ball circulating grooves 16 and 17 are formed on inwardly projected wall surfaces at the lower ends of the inclined walls 12 and 13, respectively.

Indicated at 18 and 19 are axial ball circulating holes which extend through the ceiling wall 11 in vertically spaced parallel relation with the ball circulating grooves 14 and 15, respectively.

Ball recirculating holes 20 and 21 are formed longitudinally through the walls of hooked bearing portions 24 and 25, beneath open end faces 22 and 23 thereof, respectively, in spaced parallel relation with the ball circulating grooves 16 and 17.

The bearing body 10 is provided with screw holes 37 symmetrically in the opposite end and center portions of the ceiling wall 11 for fixing retainers 43 and 44 which will be described hereinlater. Similarly, screw holes 38 are formed in the opposite end portions of inclined wall surfaces 39 and 40 beneath the afore-mentioned open end faces 22 and 23, respectively, for fixing the lower ends of the retainers 43 and 44 by screws.

Denoted at 70 and 71 are positioning holes formed in the end faces of the bearing body 10 and end lids 26, into which mounting bolts 28 are threaded through positioning bushes 27 to hold the end lids 26 in alignment with the bearing body 10.

The end lids 26 are provided with U-shaped turn grooves 29 in center portion and hooked bearing portions 41 and 42 to connect the ball grooves 14 to 17 with the ball circulating holes 18 to 21, respectively. Rectangular recesses 30 are provided at opposite sides of each U-groove 29 to receive opposite end portions of a guide strip 32 which is centrally provided with a semi-cylindrical ball guide portion 31.

Indicated at 36 is an inner opening which is, similarly to the cavity of the bearing body 10, shaped substantially complementarily to the shape of the track shaft which will be described hereinafter, and has open end faces 33 and 34 on hooked bearing portions 41 and 42, respectively.

The reference numerals 43 and 44 denote two symmetrical retainers which are formed by folding an elongated steel strip by a press or other suitable means and are each integrally provided on the opposite sides of a center portion 52 with a horizontal portion 53 extending along the top wall surface 49 of the track shaft 50 in small gap relation therewith, an inward aslant portion 54 extending along lower wall surface 51 of the track shaft 50 in small gap relation therewith, an upper mounting portion 45 stepped up from the horizontal portion 53 by a step portion 48 and secured to the ceiling wall 11 of the bearing body 10, and a lower mounting portion 46 spaced from the inward aslant portion 54 by a step portion 47 and secured to the inclined wall surface 39 or 40 of the hooked bearing portion 24 or 25.

Longitudinal slits 55 and 56 are formed in the horizontal and aslant portions 53 and 54 of the retainers 43 and 44 at positions opposing the ball grooves 14 to 17 in parallel relation therewith, the slits 55 and 56 having a width slightly smaller than the diameter of the balls.

When forming the longitudinal ball guide slits 55 and 56, tongues 57 are formed at the opposite ends of the respective slits 55 and 56 for scooping non-load-carrying or load-carrying balls into or out of the ball grooves 14 to 17.

The track shaft 50 generally has an X-shaped cross-section and is provided with a pair of longitudinal protuberances 58 and 59 at opposite sides of its top wall surface 60. Formed on the top wall surfaces of the protuberances 58 and 59 are longitudinal R-grooves 61 and 62 having a radius of curvature substantially same as the radius of the balls. Similar R-grooves 64 and 65 having a radius of curvature same as the radius of the balls are provided on the inwardly aslant wall surfaces 63 in confronting relation with the ball grooves 16 and 17, respectively.

Indicated at 66 are mounting holes to be used for fixing the bearing body to a slide portion of a machine tool. The reference numeral 67 denotes screw holes which are provided at three positions on each end face of the bearing body 10 for attaching the end lid 26 thereto.

The track shaft 50 is fixed to a movable or fixed portion of a machine tool or the like by way of mounting holes 68 which are provided vertically through the body of the track shaft 50.

Further, the retainers 43 and 44 are provided with mounting holes for receiving screws 69 which secure the respective retainers to the bearing body 10. Denoted at 72 are upper inclined wall surfaces on leg portions 73 and 74 of the track shaft 50.

The linear ball bearing unit of the above-described construction according to the present invention is assembled in the order as follows.

In the first place, the retainers 43 and 44 are fitted into the bearing body 10 and fixed in position on the inner wall surfaces of the latter by threading screws into the mounting holes 70. In the next place, half portions of the bushes 27 are inserted into the positioning holes 70 on one end face of the bearing body 10.

On the other hand, the opposite end portions of the guide strip 32 with the semi-cylindrical ball guide portion 31 are fitted into the square recesses 30 across the U-shaped groove 29 of the end lid 26, and the end lid 26 with the U-shaped turn grooves is positioned flush with the bearing body 10, receiving the remaining halves of the positioning bushes 27 in the positioning holes 71 of the end lid 26, and clamped to the bearing body 10 by the mounting bolts 28.

Thereafter, a predetermined number of balls 72 are successively put into the ball circulating holes 18 to 21, and finally the other end lid 26 is attached to the opposite end of the bearing body 10.

The linear ball bearing unit of the invention operates as follows. For instance, the track shaft is attached to a fixed portion of a machine tool and the bearing body is mounted on the track shaft. As the bearing body is moved forward together with, for example, a machine table, the rows of load-carrying balls 85 between the R-grooves of the track shaft and the ball grooves of the bearing body are caused to roll under the guidance of the longitudinal slits of the respective retainers and scooped along the round surfaces of the tongues at the ends of the respective slits and along the curved surfaces of the semi-cylindrical ball guide portions of the guide strips in the U-shaped grooves to enter the recirculating holes in the bearing body as non-load-carrying balls 85'.

When the vertical load which is carried by the two rows of balls 85 between the ball grooves at the corners of the ceiling wall of the bearing body and the ball grooves on the top wall surface on the track shaft is rated as 1, 0.7 of the upward load is carried by the balls 85 between the R-grooves on the inwardly aslant wall surfaces of the track shaft and the ball grooves on the hooked bearing portions since the latter balls are contacted with the ball grooves at an angle of 45°, with a capacity of carrying vertical as well as lateral loads.

The joining surfaces of the bearing body and the end lids are secured in alignment with each other by the mounting bolts which are threaded into the aligning holes on the joining end faces of the bearing body and the end lids through bushes, completely precluding misalignment and ensuring smooth rolling movements of the balls.

Figure 11:
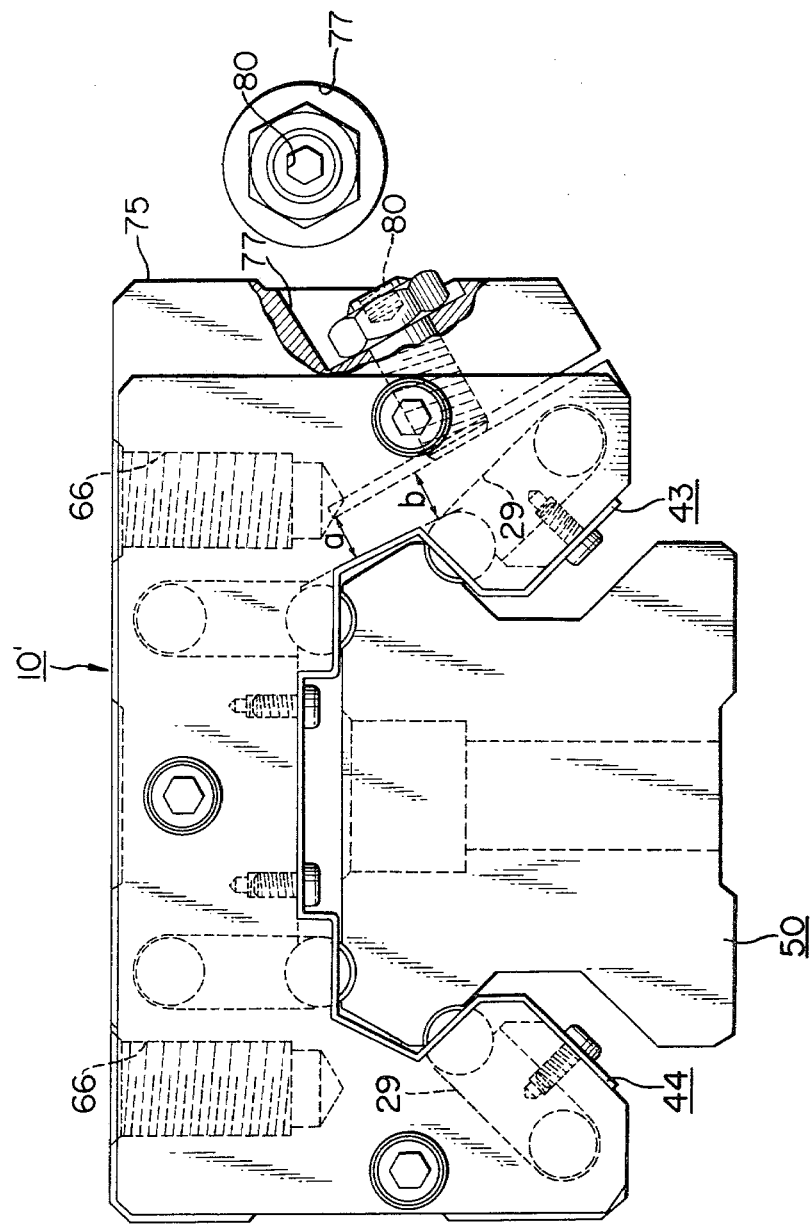
FIG. 11 is a partly cutaway end view of a linear ball bearing unit with a clearance adjuster on one side wall.

FIG. 11 shows another embodiment of the present invention in a partly sectioned end view, in which one side wall 25 of the bearing body 10' has a greater thickness than the other one, with a longitudinal slotted groove 76 formed at an angle of about 60° with a horizontal plane.

Indicated at 77 are counter sinks which are formed on the side wall 75 of the bearing body 10' substantially at right angles with the slotted groove 76. A through-hole 78 with internal thread 79 is formed at the center of each counter sink 77, the axis of the through hole 78 being located beneath the ball groove 16. Adjusting bolts 80 to 82 are threaded into the respective tapped holes 78.

Lock nuts 83 are threaded on the outer peripheries of the adjusting bolts 80 to 82 to block the rotation thereof. Other component parts are same as in the foregoing embodiment and thus their explanation is omitted.

A slotted groove 76 is formed in the side wall of greater thickness of the bearing body 10' at an angle of about 60° with a horizontal plane as described above, splitting the side wall to have a wall thickness a between the fore end of the slotted groove 76 and the inner inclined wall surface 12 which is smaller than the wall thickness b between the base portion 84 of the inclined surface 12 and the slotted groove 76.

Therefore, if the slotted groove 76 is formed deeper, the thickness a becomes smaller to make the adjustment of clearance extremely easy. Under high load conditions, the load-carrying balls between the ball groove 16 and the R-groove 64 on the track shaft are rolled in flexed state.

By slightly reducing the clamping torque of the adjusting bolts 80 and 82 as compared with that of the center adjusting bolt 81, it is possible to produce the so-called crowning effect, that is to say, to widen the clearance slightly at the opposite ends of the bearing body or to narrow the clearance in the middle portion, adding an advantage of interchangeability and permitting extremely smooth rolling movement of the balls.

Figure 12:
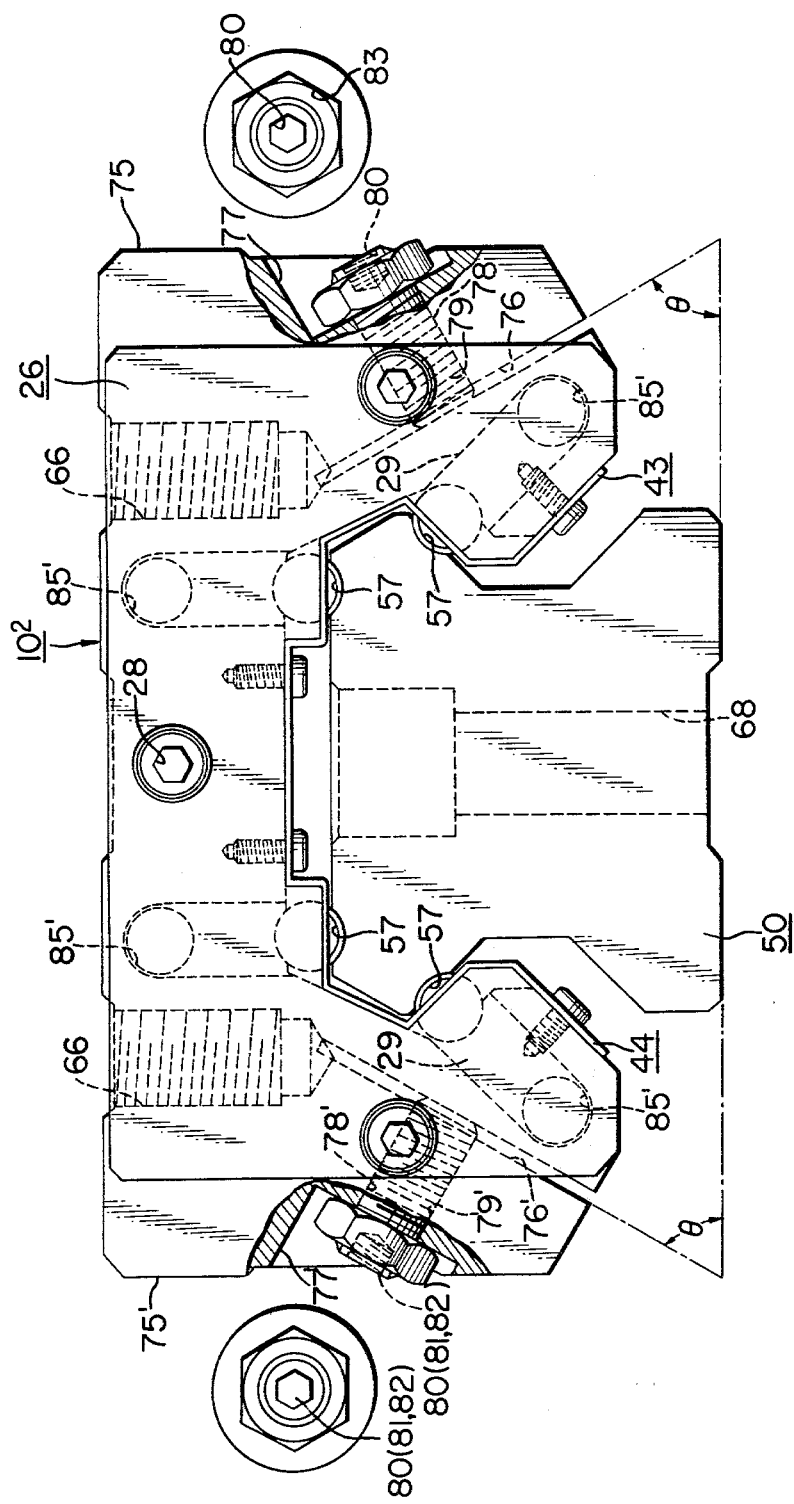
FIG. 12 is a partly cutaway end view of a linear ball bearing unit with clearance adjusters on opposite side walls.

In another embodiment of the invention shown in FIG. 12, the bearing body $10^2$ has both side walls 75 and 75' formed in an increased wall thickness, with longitudinal slotted grooves 76 and 76' at an angle of about 60° with a horizontal plane. Counter sinks 77 and 77' are provided on the right and left side walls 75 and 75' of the bearing body $10^2$ at an angle of about 90° with the slotted grooves 76 and 76', respectively.

Through holes 78 and 78' with female screws 79 and 79' are formed to have the respective axes located beneath the ball grooves 16 and 17, respectively, and adjusting bolts 80 to 82 and 80' to 82' are threaded into the female screws 79 and 79'.

Denoted at 83' are lock nuts. Other component parts are same as in the foregoing embodiments and thus their explanation is omitted.

Since the bearing body $10^2$ is provided with longitudinal slotted grooves 76 and 76' in the right and left side walls of increased thickness at an angle of about 60° with a horizontal plane, there can be produced crowning effect at the opposite ends of the ball grooves 16 and 17 by slightly reducing the clamping torque of the adjusting bolts 80, 82, 80' and 82' as compared with that of the center adjusting bolts 81 and 81'.

Thus, the clearance adjustment is possible on either side of the bearing body to provide a balanced ball bearing unit. In addition, the adjustable amount is doubled, allowing correction of machining errors and providing an interchangeable bearing body.

Figure 13:
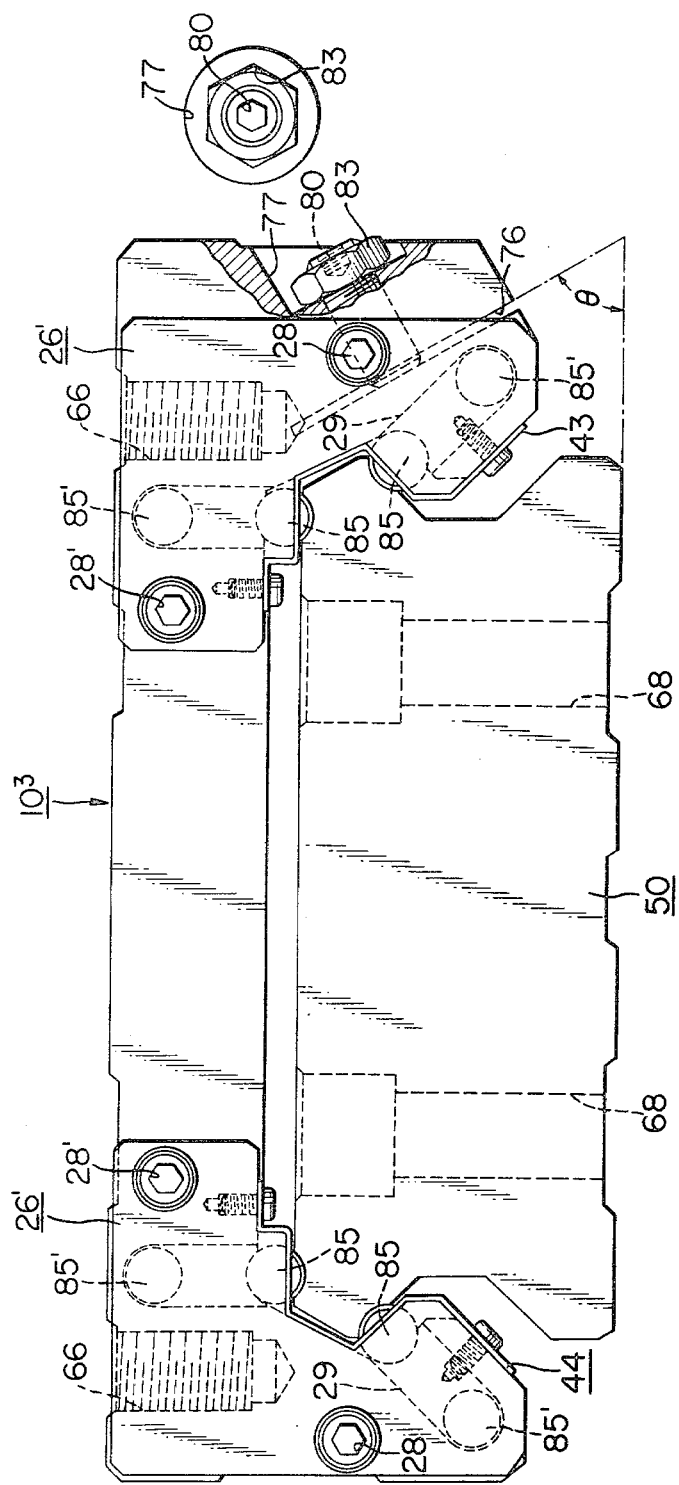
FIG. 13 is a partly cutaway end view of a linear ball bearing unit of a greater width employing split type side walls on opposite sides of the bearing body.

Referring to FIG. 13, there is shown another embodiment of the present invention, in which the bearing unit employs a split type bearing body $10^3$ of an increased width, in combination with a track shaft of an increased width.

The construction of the side walls of the bearing body $10^3$ including the clearance adjusting mechanism is same as the foregoing embodiment except that the side walls 26' are separable and attached to opposite sides of a longitudinally extending spacer of suitable width by bolts 28'. The separable side walls can be attached and detached quite easily, coupled with the advantage that it is possible to save the bearing material.

What is claimed is:

1. A linear ball bearing unit, comprising:
   a bearing body having a cavity of substantially trapezoidal shape in section and provided with longitudinal ball grooves with the same radius of curvature as the balls along four corners of said cavity and longitudinal ball recirculating holes extending parallel with the respective ball grooves in radially spaced positions;
   end lids to be attached to the opposite ends of said bearing body through aligning bushes and provided with turn grooves of U-shape in section to interconnect the opposing ball grooves and ball recirculating holes of said bearing body, said end lids having square recesses at opposite sides of said U-shaped turn grooves to receive a guide strip across each U-shaped groove, said guide strip having a semi-cylindrical ball guide portion over the entire width of said U-shaped groove;

retainers to be fitted on the inner wall surfaces of said cavity of the bearing body and provided with longitudinal slits in horizontal portions opposing said ball grooves, said slits having a width slightly smaller than the diameter of balls and being provided with round tongues integrally at opposite ends thereof;

a number of balls placed in the bearings constituted by said bearing body and end lids through said retainers; and an longated track shaft located in said cavity and having longitudinally therealong ball grooves of a radius of of curvature same as the radius of load-carrying balls.

2. A linear ball bearing unit as defined in claim 1, wherein at least one side wall of said bearing body is formed to have an increased wall thickness and provided with a longitudinal slotted groove at an inclination relative to a horizontal plane and tapped through holes formed at an angle of about 90° with said said slotted groove to receive clearance adjusting bolts.

* * * * *